(12) United States Patent
Forthaus et al.

(10) Patent No.: US 12,252,934 B2
(45) Date of Patent: Mar. 18, 2025

(54) DRIVE ARRANGEMENT FOR A DOOR DEVICE, AND DOOR DEVICE

(71) Applicant: FRABA B.V., Sg Heerlen (NL)

(72) Inventors: Martin Forthaus, Cologne (DE); Konrad Machill, Cologne (DE)

(73) Assignee: FRABA B.V., Sg Heerlen (NL)

(*) Notice: Subject to any disclaimer, the term of this patent is extended or adjusted under 35 U.S.C. 154(b) by 559 days.

(21) Appl. No.: 17/440,797

(22) PCT Filed: Mar. 17, 2020

(86) PCT No.: PCT/EP2020/057333
§ 371 (c)(1),
(2) Date: Sep. 20, 2021

(87) PCT Pub. No.: WO2020/187932
PCT Pub. Date: Sep. 24, 2020

(65) Prior Publication Data
US 2022/0162909 A1 May 26, 2022

(30) Foreign Application Priority Data
Mar. 21, 2019 (DE) .................. 10 2019 107 322.7

(51) Int. Cl.
*E06B 9/70* (2006.01)
*E06B 9/68* (2006.01)
(52) U.S. Cl.
CPC ........ *E06B 9/70* (2013.01); *E06B 2009/6836* (2013.01); *E06B 2009/6854* (2013.01)

(58) Field of Classification Search
CPC ................ E06B 9/70; E06B 2009/725; E06B 2009/6818; E06B 2009/6836;
(Continued)

(56) References Cited

U.S. PATENT DOCUMENTS 4,674,391 A * 6/1987 Bohm .................. F42B 33/025
86/1.1
5,324,240 A * 6/1994 Guttinger ................ F16H 21/14
475/162
(Continued)

FOREIGN PATENT DOCUMENTS

CN 204343959 U 5/2015
CN 105909162 A * 8/2016
(Continued)

*Primary Examiner* — Abe Massad
*Assistant Examiner* — Matthew R. Shepherd
(74) *Attorney, Agent, or Firm* — Norman B. Thot

(57) ABSTRACT

A drive arrangement for a door device which includes a door member. The drive arrangement includes a door shaft, a driven shaft which is operatively connected to the door shaft, a transmission arrangement which drives the door shaft, and at least one electric motor which is coupled to the transmission arrangement to move the door member of the door device from a closed state to an open state and vice versa. The at least one electric motor has at least one eccentric drive shaft. The transmission arrangement includes an eccentric gear transmission which has at least two orbiting toothed disks, each of which have an internal toothing. The at least two orbiting toothed disks are driven by the at least one eccentric drive shaft of the at least one electric motor, and, via the internal toothing, engage with the driven shaft.

7 Claims, 2 Drawing Sheets

(58) Field of Classification Search
CPC ..... E06B 2009/6854; E06B 2009/6872; E06B 2009/6881; E06B 2009/6863; F16H 23/00; F16H 25/00; F16H 25/02; F16H 25/04
USPC ...... 74/122, 123, 437, 665 B, 665 D, 665 E, 74/63
See application file for complete search history.

(56) References Cited

U.S. PATENT DOCUMENTS

| | | | | |
|---|---|---|---|---|
| 5,423,628 | A * | 6/1995 | Jaworski | E01C 19/40 404/114 |
| 5,425,683 | A * | 6/1995 | Bang | F16H 1/32 475/162 |
| 6,422,965 | B1 * | 7/2002 | Balli | E06B 9/74 160/310 |
| 2004/0139654 | A1 | 7/2004 | Sanke et al. | |
| 2010/0229665 | A1 * | 9/2010 | Ambardekar | F16H 3/70 74/332 |
| 2011/0092332 | A1 * | 4/2011 | Evenson | F16H 1/003 475/168 |
| 2012/0053731 | A1 * | 3/2012 | Feldstein | E06B 9/70 160/311 |
| 2013/0112357 | A1 * | 5/2013 | Gontarski | E06B 9/13 160/311 |
| 2013/0117078 | A1 * | 5/2013 | Weik, III | G06Q 10/00 705/13 |
| 2013/0319145 | A1 | 12/2013 | Shimada | |
| 2017/0260806 | A1 * | 9/2017 | Adams | H04W 52/0245 |
| 2018/0010926 | A1 | 1/2018 | Forthaus | |
| 2018/0119476 | A1 * | 5/2018 | Quaiser | E05F 15/632 |

FOREIGN PATENT DOCUMENTS

| | | |
|---|---|---|
| CN | 206000338 U | 3/2017 |
| CN | 107209026 A | 9/2017 |
| DE | 20 2012 012 478 U1 | 4/2013 |
| DE | 10 2015 101 248 A1 | 7/2016 |
| DE | 10 2015 107 416 A1 | 11/2016 |
| DE | 10 2017 126 124 A1 | 1/2019 |
| EP | 0 551 050 A1 | 7/1993 |
| EP | 0 589 760 A1 | 3/1994 |
| EP | 1 965 018 A2 | 9/2008 |
| EP | 1 426 538 B1 | 5/2011 |
| JP | H06-241290 A | 8/1994 |
| JP | 2000-154689 A | 6/2000 |
| JP | 2005-36515 A | 2/2005 |
| JP | 2017-179736 A | 10/2017 |
| WO | WO 2009/053996 A1 | 4/2009 |
| WO | WO 2012/111049 A1 | 7/2014 |
| WO | WO 2019/007764 A1 | 1/2019 |

* cited by examiner

DRIVE ARRANGEMENT FOR A DOOR DEVICE, AND DOOR DEVICE

CROSS REFERENCE TO PRIOR APPLICATIONS

This application is a U.S. National Phase application under 35 U.S.C. § 371 of International Application No. PCT/EP2020/057333, filed on Mar. 17, 2020 and which claims benefit to German Patent Application No. 10 2019 107 322.7, filed on Mar. 21, 2019. The International Application was published in German on Sep. 24, 2020 as WO 2020/187932 A1 under PCT Article 21(2).

FIELD

The present invention relates to a drive arrangement for a door device having at least one electric motor, which is coupled to a transmission arrangement that drives a door shaft in order to move a door member of the door device from a closed state to an open state and vice versa. The present invention also relates to a door device having such a drive arrangement.

BACKGROUND

Drive arrangements for door devices have previously been described. EP 1965018 A2 describes such a drive device. Increasingly stringent safety requirements for power-operated door devices necessitate complex mechanical or even electronic arrangements. The drive arrangement of EP 1965018 A2 thus comprises a self-locking transmission with a tension spring compensation that counteracts an unintentional opening of the door member. Additional safety catches and/or brakes can also be provided which prevent an unintentional movement of the door member in case the transmission parts fail. It should be clear that such drive arrangements are complex and thus expensive to manufacture and to assemble.

EP 0551050 B1 describes an eccentric gear transmission which provides a clear and highly precise guidance of orbiting parts.

SUMMARY

An aspect of the present invention is to provide a drive arrangement and a door device, respectively, having a drive arrangement which avoids the above-mentioned disadvantages in a simple manner.

In an embodiment, the present invention provides a drive arrangement for a door device which includes a door member. The drive arrangement includes a door shaft, a driven shaft which is operatively connected to the door shaft, a transmission arrangement which is configured to drive the door shaft, and at least one electric motor which is coupled to the transmission arrangement so as to move the door member of the door device from a closed state to an open state and vice versa, the at least one electric motor comprising at least one eccentric drive shaft. The transmission arrangement comprises an eccentric gear transmission which comprises at least two orbiting toothed disks each of which comprise an internal toothing. The at least two orbiting toothed disks are configured to be driven by the at least one eccentric drive shaft of the at least one electric motor, and, via the internal toothing, to engage with the driven shaft which is operatively connected to the door shaft.

BRIEF DESCRIPTION OF THE DRAWINGS

The present invention is described in greater detail below on the basis of embodiments and of the drawings in which.

DETAILED DESCRIPTION

Figure 1:
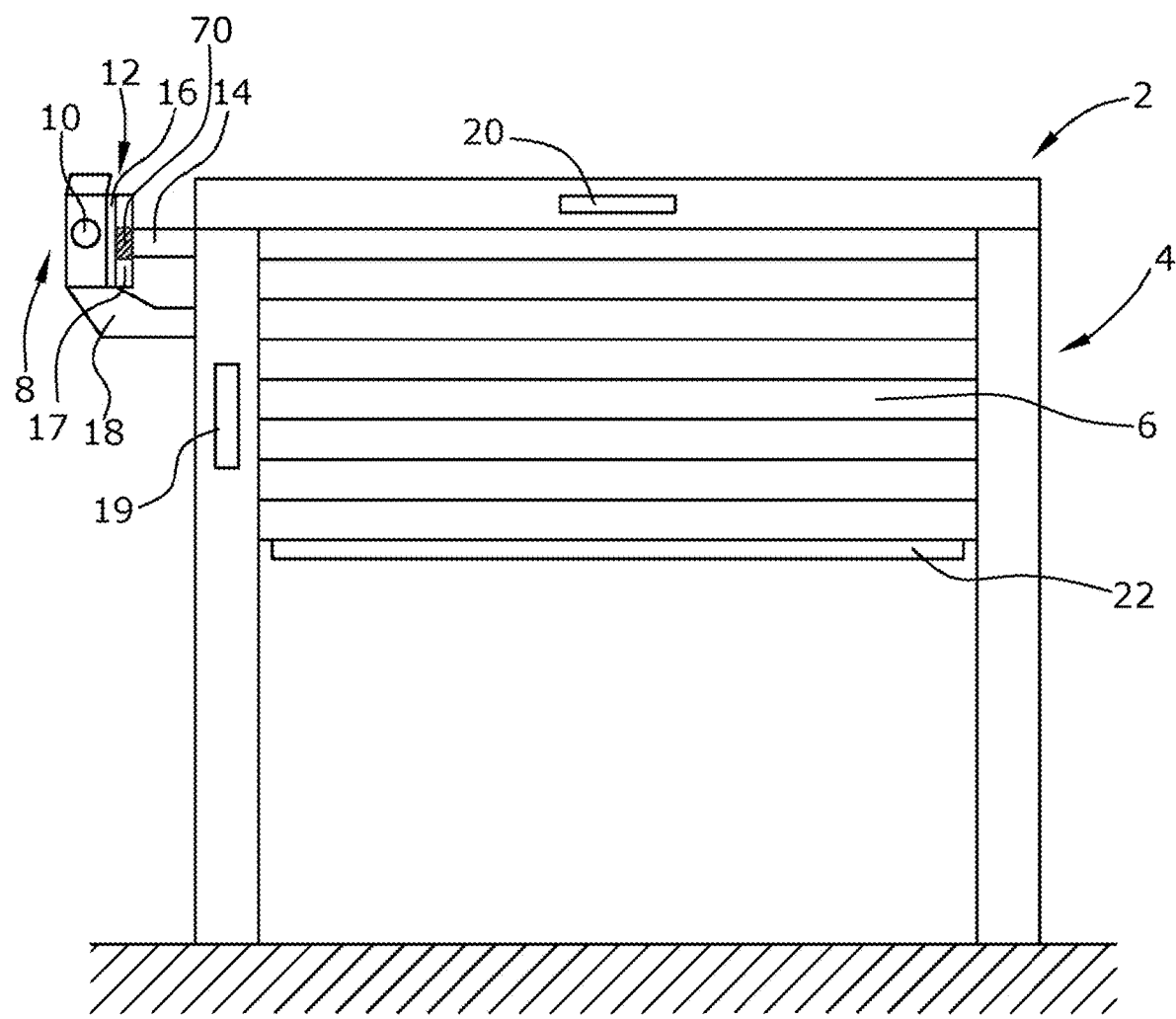
FIG. 1 shows a schematic view of a door device having a drive arrangement.

The present invention provides a drive arrangement where the transmission arrangement is configured as an eccentric gear transmission, wherein at least two orbiting toothed disks, which are adapted to be driven by at least one eccentric shaft of the at least one electric motor, engage via an internal toothing with a driven shaft that is connected to the door shaft. This provides a particularly simple, and thus inexpensive to manufacture, drive arrangement which has a high-precision transmission arrangement which, due to the high number of teeth in engagement, operates with low wear in comparison with conventional transmission arrangements and is ready for operation even when wear occurs and, due to the use of at least two orbiting toothed disks, meets the high safety requirements for possible transmission failure, for example, due to toothed disk breakage. The transmission arrangement is also self-locking so that it does not, for example, require the use of brakes. It can in this case make sense to use several electric motors to increase the torque.

In an advantageous embodiment, the toothed disks can, for example, be arranged to be synchronous or phase-shifted. In case of a phase-shifted arrangement, for example, offset by an angle of 180°, the toothed disks are each in contact with different areas of the drive shaft, whereby the driven shaft is loaded more evenly.

According to a particularly advantageous embodiment, such a drive arrangement can, for example, be provided with a door control device which is connected at least to the electric motor in terms of control. It is thus possible to integrate the drive arrangement in a simple manner into a control arrangement of the entire door device. In a particularly advantageous manner, the door control device is adapted to be operated or read out wirelessly, for example, via WLAN or Bluetooth. In addition to the usual control functions, remote operation and maintenance can thus also be carried out with the aid of data from the drive arrangement. The maintenance device could here communicate with the door controller via a data bus, for example, and trigger test movements and transmit the maintenance information obtained thereby to the door controller, which in turn stores this data for the purpose of maintaining an electronic test log and/or forwards the data to an external memory using wired or wireless data transmission device.

In a particularly advantageous manner, at least one rotary encoder on the eccentric shaft and/or at least one rotary encoder on the driven shaft are provided, which are connected to the door control device in terms of control. The comparison with values stored in the door control device makes it possible to easily determine the end positions of the door member. It is thus also possible to determine any wear of the drive arrangement and/or the transmission arrangement, if necessary. Constant comparison of the angular position with sufficient clearance could also detect the door leaf hitting an obstacle.

It can also be advantageous to provide at least one speed sensor on the driven shaft. This makes it easy to detect an abrupt stop of the door member, for example, in the event of an obstacle collision, and thus replace a tactile safety device.

In order to monitor the drive arrangement in a simple manner and to also be able to maintain the drive arrangement, further sensors such as a temperature sensor, a vibration sensor, a torque sensor, an ammeter, etc. can be provided in the area of the electric motor. A torque sensor can, for example, be arranged on a torque support and provide spring monitoring of a spring that balances the door in a known manner.

The electric motor is advantageously a DC motor. This makes it possible to connect the drive arrangement to an existing domestic power grid.

The fact that the at least two orbiting toothed disks are flexibly or rigidly coupled to each other via a connecting device provides a particularly high redundancy of the drive arrangement, even if one toothed disk breaks.

It is furthermore also conceivable that the electric motor is operatively connected to the eccentric gear transmission via a traction gear, which allows the electric motor to be designed more simply and, if necessary, an additional gear ratio to be realized.

In a further advantageous embodiment, the toothed disks can, for example, have an internal toothing provided on an outer side, each of which is formed in a pitch circle. It is here particularly advantageous if three toothed disks are provided which orbit in a phase-shifted manner to one another and are adapted to be driven by three eccentric shafts.

The present invention also provides a door device having such a drive arrangement in which a frame arrangement for the door member is provided on which the drive arrangement is arranged.

Further sensor arrangements, such as a safety edge arrangement, a light grid, a 3D sensor, are advantageously provided which are connected wirelessly to the door control device in terms of control. Wired arrangements must of course also be included depending on the application.

The present invention is described in greater detail below under reference to the drawings.

FIG. 1 shows a schematic view of a door device 2. It should here be noted that the term "door device" is understood to mean any type of closing member for an opening. In a known manner, the door device 2 has a frame arrangement 4 in which a door member 6 is slidingly guided. A drive arrangement 8 is provided on the frame arrangement 4, the drive arrangement 8 having an electric motor 10 and a transmission arrangement 12, via which a door shaft 14 can be driven so that the door member 6 can be moved from a closed state to an open state and vice versa. In the present exemplary embodiment, the electric motor 10 is a customary DC motor. A transmission 16 is connected to the electric motor 10 in a known manner. The transmission 16 can be designed as a worm gear with deflection or as a traction gear without deflection. In the present case, the transmission 16 and an eccentric gear transmission 17 form the transmission arrangement 12. The drive arrangement 8 and the transmission arrangement 12 are here provided on a torque support 18 which is firmly connected to the frame arrangement 4 in a known manner. The drive arrangement 8 can be arranged at a distance from the door shaft 14 when the transmission 16 is designed as a traction gear. It is also conceivable that a motor drive shaft of the drive arrangement 8 (which is not further shown in the drawings) is directly connected to the eccentric gear transmission 17.

The door member 6 is here shown in an intermediate position. A door control device 19 is also shown, which is connected wirelessly via Bluetooth and/or WLAN to the electric motor 10, to a 3D sensor 20, and to a safety edge 22, in a cable-free manner. The 3D sensor 20 is here used for contactless monitoring of a surrounding area of the door member 6. The safety edge 22 is a tactile safety element and is used in a known manner for obstacle monitoring and stops a movement of the door member 6 when it hits an obstacle.

In order to further increase the functionality and safety of the drive arrangement 8 and the door device 2, rotary encoders can, for example, be provided. The rotary encoders are thereby connected to the door control device 19 in terms of control so that wear of the drive arrangement 8 can, for example, be determined by a change in the rotational ratio. A speed sensor can, for example, also be provided on a driven shaft via which a collision with an obstacle can, for example, be detected. The safety edge 22 could then be omitted. Further sensors such as a temperature sensor, a vibration sensor, etc. can also be provided on the drive arrangement 8, in particular in the area of the electric motor 10, in order to detect abnormalities of the electric motor 10 and the drive arrangement 8.

Figure 2:
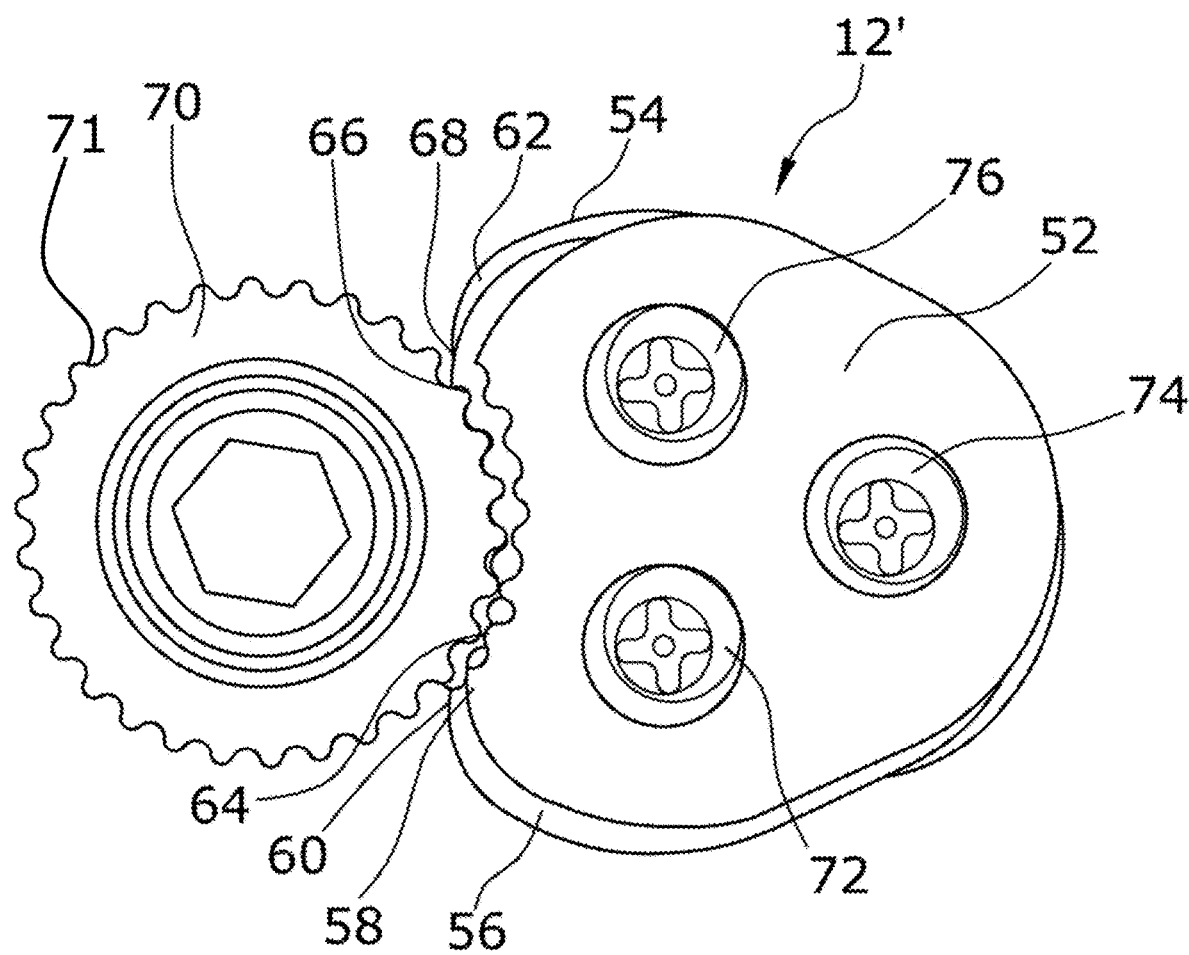
FIG. 2 shows a schematic view of an embodiment of a transmission arrangement.

A schematic view of an embodiment of a transmission arrangement 12' is shown in FIG. 2. The transmission arrangement 12' has three toothed disks 52, 54, 56. Each of the three toothed disks 52, 54, 56 has an outer periphery 58, 60, 62 which comprises a concave part. A part-ring-shaped internal toothing 64, 66, 68 is arranged in the concave part of the outer periphery 58, 60, 62. In the view shown, just the toothed disk 54 is in engagement with an external toothing 71 of the driven shaft 70 via its part-ring-shaped internal toothing 66. The toothed disks 52, 54, 56 are driven by three eccentric drive shafts 72, 74, 76.

The present invention is not limited to embodiments described herein; reference should be had to the appended claims.

LIST OF REFERENCE NUMERALS

2 Door device
4 Frame arrangement
6 Door member
8 Drive arrangement
10 Electric motor
12 Transmission arrangement
12' Transmission arrangement
14 Door shaft
16 Transmission
17 Eccentric gear transmission
18 Torque support
19 Door control device
20 3D sensor
22 Safety edge
52 Toothed disk
54 Toothed disk
56 Toothed disk
58 Outer periphery
60 Outer periphery
62 Outer periphery
64 Internal toothing
66 Internal toothing
68 Internal toothing
70 Driven shaft
71 External toothing
72 Eccentric drive shaft
74 Eccentric drive shaft
76 Eccentric drive shaft

The invention claimed is:

1. A drive arrangement to drive a door shaft of a door, the drive arrangement comprising:
   a driven shaft which is operatively connected to the door shaft, the driven shaft comprising an external toothing;
   a transmission arrangement which is configured to drive the driven shaft, the transmission arrangement comprising an eccentric gear transmission which comprises three orbiting toothed disks which are configured to orbit in a phase-shifted manner with respect to one another, each of the three orbiting toothed disks comprising,
   an outer periphery which comprises a concave part, and
   an internal toothing which is arranged in the concave part of the outer periphery,
   wherein the internal toothing of each of the three orbiting toothed disks is configured to mesh with the external toothing of the driven shaft; and
   three eccentric drive shafts, each of the three eccentric drive shafts being configured to drive the three orbiting toothed disks.

2. The drive arrangement as recited in claim 1, wherein the transmission arrangement is provided as a connecting device which is configured to flexibly or rigidly couple the three orbiting toothed disks to each other.

3. A door device comprising the drive arrangement as recited in claim 1, wherein the drive arrangement is arranged on a frame arrangement for the door.

4. A drive arrangement to drive a door shaft of a door, the drive arrangement comprising:
   a driven shaft which is operatively connected to the door shaft, the driven shaft comprising an external toothing;
   a transmission arrangement which is configured to drive the driven shaft, the transmission arrangement comprising an eccentric gear transmission which comprises at least two orbiting toothed disks, each of the at least two orbiting toothed disks comprising,
   an outer periphery which comprises a concave part, and
   an internal toothing which is arranged in the concave part of the outer periphery,
   wherein the internal toothing of each of the at least two orbiting toothed disks is configured to mesh with the external toothing of the driven shaft; and
   at least one eccentric drive shaft which is configured to drive the at least two orbiting toothed disks.

5. The drive arrangement as recited in claim 4, wherein the at least two orbiting toothed disks are arranged to be synchronous or phase-shifted with respect to each other.

6. The drive arrangement as recited in claim 4, wherein the transmission arrangement is provided as a connecting device which is configured to flexibly or rigidly couple the at least two orbiting toothed disks to each other.

7. A door device comprising the drive arrangement as recited in claim 4, wherein the drive arrangement is arranged on a frame arrangement for the door.

\* \* \* \* \*